United States Patent [19]

Hadano et al.

[11] Patent Number: 5,058,867

[45] Date of Patent: Oct. 22, 1991

[54] CYLINDRICAL VIBRATION DAMPING BUSHING

[75] Inventors: Katsuya Hadano, Kasugai; Masato Ueno, Komaki, both of Japan

[73] Assignee: Toyoda Gosei Co., Ltd., Nishikasugai, Japan

[21] Appl. No.: 679,996

[22] Filed: Apr. 1, 1991

Related U.S. Application Data

[63] Continuation of Ser. No. 418,266, Oct. 6, 1989, abandoned.

[30] Foreign Application Priority Data

Oct. 27, 1988 [JP] Japan .............................. 63-140187[U]
Jun. 29, 1989 [JP] Japan ................................ 1-76841[U]

[51] Int. Cl.⁵ ............................................... F16F 1/38
[52] U.S. Cl. .............................. 267/141.3; 267/141.5; 267/141.7; 267/153; 267/293; 248/635; 280/673; 384/146; 384/203; 384/222; 403/226
[58] Field of Search ............... 267/141.2, 141.3, 141.4, 267/141.5, 141.7, 292, 293, 153, 220; 248/635; 280/673; 384/145, 146, 203, 222; 403/225, 226, 227, 228

[56] References Cited

U.S. PATENT DOCUMENTS

| | | | |
|---|---|---|---|
| 2,572,215 | 10/1951 | Swart | 403/228 |
| 2,659,619 | 11/1953 | Kishling et al. | 267/293 |
| 2,855,232 | 10/1958 | Kozak | 384/203 |
| 2,881,032 | 4/1959 | Connolly | 384/145 |
| 4,591,184 | 5/1986 | Matschinsky | 280/673 X |
| 4,767,108 | 8/1988 | Tanaka et al. | 267/141.2 X |

FOREIGN PATENT DOCUMENTS

| | | | |
|---|---|---|---|
| 1625561 | 8/1970 | Fed. Rep. of Germany | 403/227 |
| 1206764 | 2/1960 | France | 267/153 |
| 1312969 | 11/1962 | France | 267/153 |
| 61-49143 | 4/1986 | Japan . | |
| 62-110616 | 7/1987 | Japan . | |
| 62-110617 | 7/1987 | Japan . | |
| 62-110618 | 7/1987 | Japan . | |
| 62-110619 | 7/1987 | Japan . | |
| 62-110620 | 7/1987 | Japan . | |
| 62-110644 | 7/1987 | Japan . | |
| 63-44572 | 11/1988 | Japan . | |

*Primary Examiner*—George E. A. Halvosa
*Attorney, Agent, or Firm*—Cushman, Darby & Cushman

[57] ABSTRACT

A cylindrical vibration damping bushing is provided which has an outer cylinder, an inner cylinder coaxially disposed within the outer cylinder, and having a radially outwardly expanded portion in its axially central portion, a pair of vibration damping rubber members press-fitted between the outer cylinder and the inner cylinder from both ends of the outer cylinder, and a pair of inserts, each being made of a resin material having good slidability and embedded in an inside end portion of each vibration damping rubber member so that an inside end surface thereof abut on each other. Each insert has a concave surface having a configuration conforming to that of the spherical outer surface of the expanded portion of the inner cylinder to enable the inserts to be slid on the spherical outer surface of the expanded portion. Each vibration damping rubber member has a seal portion in an outside end portion thereof, which is in air tight contact with the inner cylinder for retaining a lubricant between the concave surface of each insert and the spherical outer surface of the inner cylinder whereby the outer cylinder can be freely rotated about and twistingly rocked on the spherical outer surface of the inner cylinder with a simple construction and reduced production costs.

11 Claims, 4 Drawing Sheets

CYLINDRICAL VIBRATION DAMPING BUSHING

This is a continuation of application Ser. No. 07/418,266, filed on Oct. 6, 1989, which was abandoned.

BACKGROUND OF THE INVENTION

1. Field of the Invention

The present invention relates to a cylindrical vibration damping bushing, and more particularly to a simply-structured vibration damping bushing which is preferably used in a coupling portion of a vehicle part such as a suspension arm.

2. Description of the Prior Art

Conventional cylindrical vibration damping bushing are provided with a vibration damping rubber body between coaxially disposed inner and outer cylinders, and are frequently used in portions of a vehicle which require vibration isolation.

In the cylindrical vibration damping bushing used in the coupling portion of the suspension arm, the inner cylinder and the outer cylinder are ordinarly rotatable relative to each other.

Recently, in order to improve the ride of a vehicle, vibration damping bushing have been developed which enable the twistable rocking of the suspension arm without any resistance. Several examples of such vibration damping bushings are disclosed in Japanese unexamined utility model publications Nos. Sho 61-49143, 62-110617, 62-110619 and 62-110644, and Japanese examined utility model publication No. Sho 63-44572. These vibration damping bushings are characterized in that an axially central portion of the inner cylinder has a spherical expanded portion, and that a vibration damping rubber body and an outer cylinder are disposed in that order around the spherical expanded portion through a resin member.

However, the above-described conventional vibration damping bushings have a relatively complex construction. They require race metal fittings for retaining the resin member, and seal members for retaining lubricant between the expanded portion and the resin member. This result in difficult assembly and maintenance of these members and accordingly the production costs are increased.

SUMMARY OF THE INVENTION

An object of the present invention is to provide a cylindrical vibration damping bushing which is simple in construction, allows the free twistable rocking of a suspension arm or the like, and can be produced at low cost.

Another object of the present invention is to provide a cylindrical vibration damping bushing which prevents the generation of play in sliding and rotating parts, and maintains good sealing performance while allowing the free twistable rocking of the suspension arm or the like.

The cylindrical vibration damping bushing in accordance with the present invention has an outer cylinder, an inner cylinder coaxially disposed within the outer cylinder, a pair of vibration damping rubber members press-fitted between the outer cylinder and the inner cylinder from both ends of the outer cylinder, and a pair of inserts, each made of a resin material having good slidability, embedded in an inside end portion of a respective vibration damping rubber member.

The axially central portion of the inner cylinder is expanded radially outwardly to form an expanded portion having a spherical outer surface. Each of the inserts is provided with a concave surface for sliding on the spherical outer surface of the expanded portion.

Each of the vibration damping rubber members is integrally provided with a seal portion extending from an outside end portion thereof towards an outer surface of each end portion of the inner cylinder. A projecting end of the seal portion is in airtight contact with the outer surface of the inner cylinder.

To assemble the cylindrical vibration damping bushing having the above-described construction, first, each insert is embedded in each of the vibration damping rubber members, and the seal portion is formed therein. Then, the thus prepared vibration damping members are press-fitted between the outer cylinder and the inner cylinder from both end openings of the outer cylinder. The concave surface of each insert comes into sliding contact with the spherical outer surface of the expanded portion while the seal portion of each of the vibration damping rubber members comes into airtight contact with the outer surface of the inner cylinder.

Upon fitting the outer cylinder in an eye of a suspension arm or the like, the suspension arm can rotate about the inner cylinder, and twistingly rock freely by virtue of the inserts sliding on the spherical outer surface of the expanded portion.

As described above, the cylindrical vibration damping bushing in accordance with the present invention enables the free twistable rocking of a suspension arm or a like vibrating arm with a simple construction so that time and labour for the maintenance and assembling of vehicle parts, as well as production costs can be greatly reduced.

DETAILED DESCRIPTION OF THE EMBODIMENTS

Figure 1:
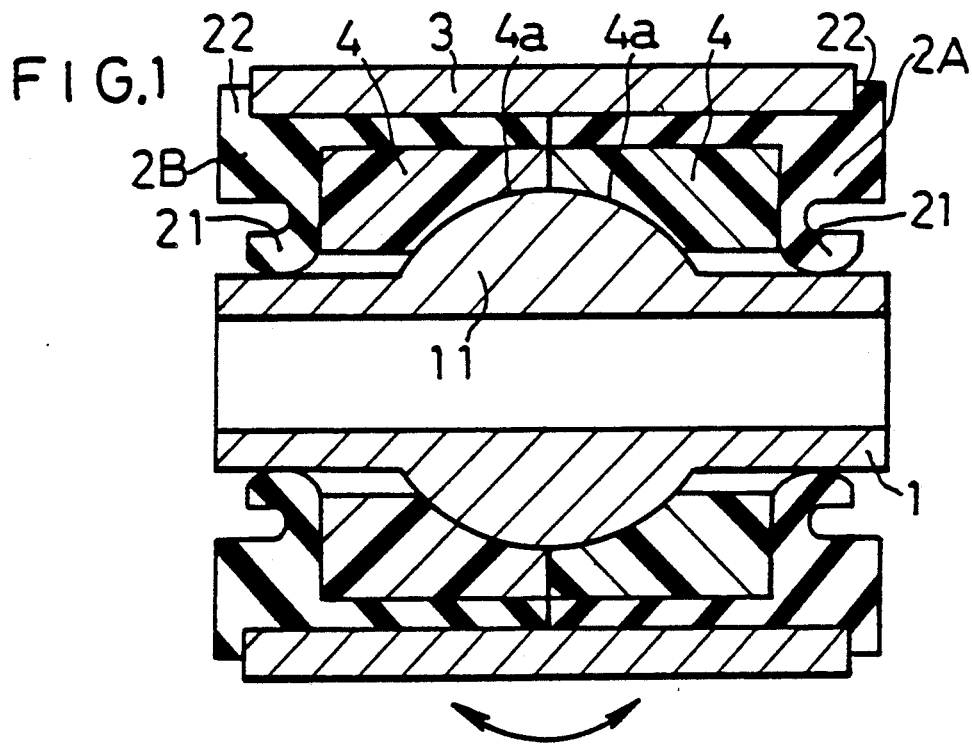
FIG. 1 is a longitudinal sectional view of a first embodiment of a vibration damping bushing according to the invention.
Figure 2:
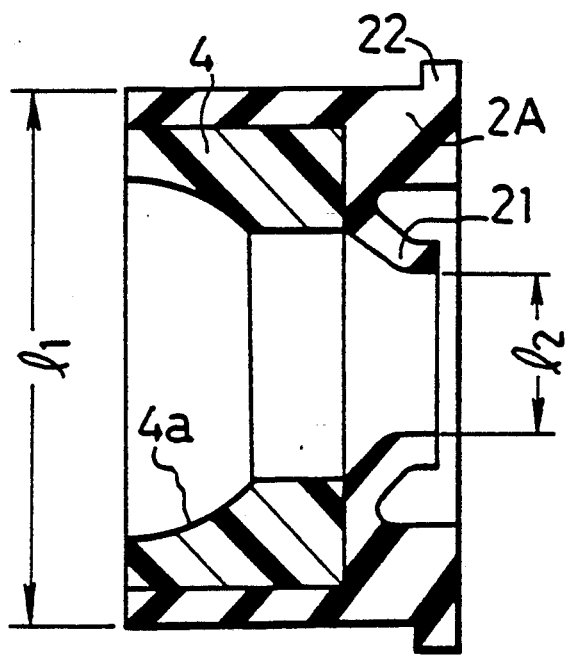
FIG. 2 is a longitudinal sectional view of a vibration damping rubber member in accordance with the first embodiment of the invention.

FIGS. 1 and 2 illustrate a first embodiment of a vibration damping bushing according to the present invention.

In FIG. 1, an inner cylinder 1 having a ring-shaped cross section is coaxially disposed within an outer cylinder 3 having a ring-shaped cross-section. The axially central portion of the inner cylinder 1 is thick to provide an expanded portion 11 which expands radially outwardly so as to have a sperical outer surface. A pair of vibration damping rubber members 2A, 2B are respectively press-fitted between the inner cylinder 1 and the outer cylinder 3 from both end openings of the outer cylinder 3.

The vibration damping rubber members 2A and 2B are the same shape and symmetrically positioned with respect to one another. The details of the vibration damping rubber member will be explained with reference to FIG. 2. The vibration damping rubber member 2A has a cylindrical shape, and the external diameter $l_1$ thereof is greater than the internal diameter of the outer cylinder 3. A cylindrical resin insert 4 having a concave surface 4a having a configuration conforming to that of half of the spherical outer surface of the expanded portion 11 is embedded in an inside half portion of the vibration damping rubber member 2A. The inserts 4 are made of a resin material having good slidability, such as high molecular weight polyethylene and a polyacetal.

A thin-walled cylindrical seal portion 21 is integrally formed in an outside half portion of the vibration damping rubber member 2A so as to extend radially inwardly, and the internal diameter $l_2$ thereof is less than the external diameter of the inner cylinder 1. An outside end portion of the vibration damping rubber member 2A projects radially outwardly like a step to provide a stopper portion 22.

A pair of vibration damping rubber members, each having the above-described construction are press fitted between the outer cylinder 3 and the inner cylinder 1 coated with lubricant from both openings of the outer cylinder 3 until inside end surfaces of the vibration damping rubber members 2A, 2B abut each other at the the expanded portion 11, and each of the stopper portions 22 abuts each of the longitudinal ends of the outer cylinder 3. In this state, the concave surfaces 4a of the inserts 4 come into sliding contact with the spherical outer surface of the expanded portion 11 via the lubricant, and projecting ends of the seal portions 21 come into elastic contact with the outer surface of the inner cylinder 1 to prevent the lubricant from leaking out from the interior of the bushing, and also prevent muddy water, dust or the like from entering there.

In using the cylindrical vibration damping bushing of the present embodiment in a coupling portion of a suspension arm of a vehicle, the outer cylinder 3 is fitted in an eye (not shown) of the suspension arm while a bolt (not shown) provided in a suspension member (not shown) is fitted in the inner cylinder 1. The slide of the inserts 4 on the spherical outer surface of the expanded portion 11 enables the suspension arm to rotate freely about the bolt of the suspension member, and to twistingly rock freely thereon in the directions shown by the arrows in FIG. 1.

Figure 3:
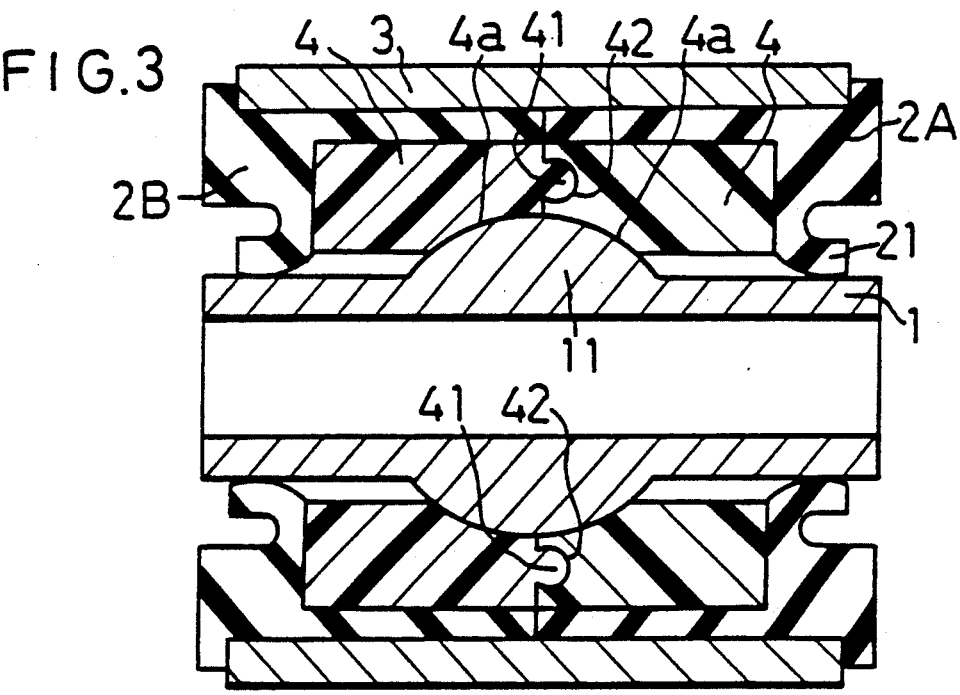
FIG. 3 is a longitudinal sectional view of a second embodiment of a vibration damping bushing according to the present invention.

FIG. 3 illustrates a second embodiment of a vibration damping bushing according to the present invention. In order to press fit the vibration damping rubber members 2A, 2B more securely, in the second embodiment an engageable convex portion 41 is provided in an inside end surface of one of the inserts 4 while an engageable concave portion 42 to be engaged with the engageable convex portion 41 is provided in the inside end surface of the other insert 4.

In accordance with the second embodiment, upon the abutting of the inside end surfaces of the vibration damping rubber members 2A, 2B on each other, the engageable convex portion 41 and the engageable concave portion 42 are engaged with each other so that the vibration damping rubber members 2A, 2B are more fixedly secured between the inner cylinder 1 and the outer cylinder 3.

Figure 4:
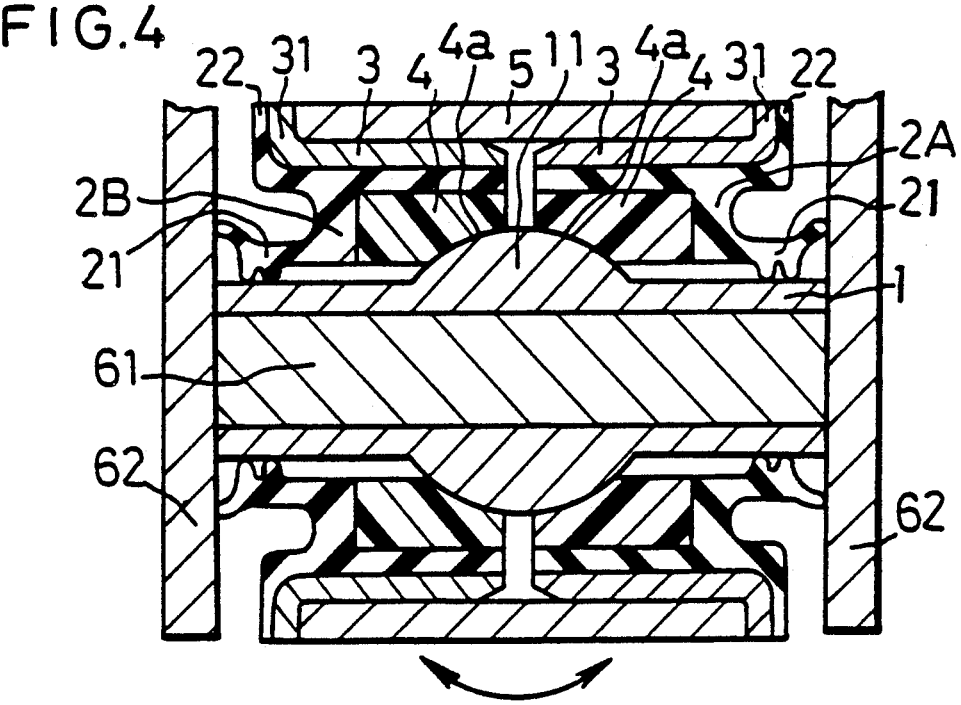
FIG. 4 is an overall longitudinal sectional view of a third embodiment of a vibration damping bushing according to the invention.

FIG. 4 illustrates a third embodiment of the present invention wherein the vibration damping bushing is used in a coupling portion of a suspension arm of a vehicle. In FIG. 4, reference numeral 5 designates an eye provided in an end of a suspension arm (not shown). The inner cylinder 1 is coaxially inserted into the eye 5, and is secured to a bracket 62 provided in a vehicle frame (not shown) by means of an axis member 61 inserted into the inner cylinder 1. An expanded portion 11 having a spherical outer surface is provided in the axially central portion of the inner cylinder 1. The vibration damping rubber members 2A, 2B are respectively press-fitted between the inner cylinder 1 and the eye 5 from both end openings of the eye 5.

Figure 5:
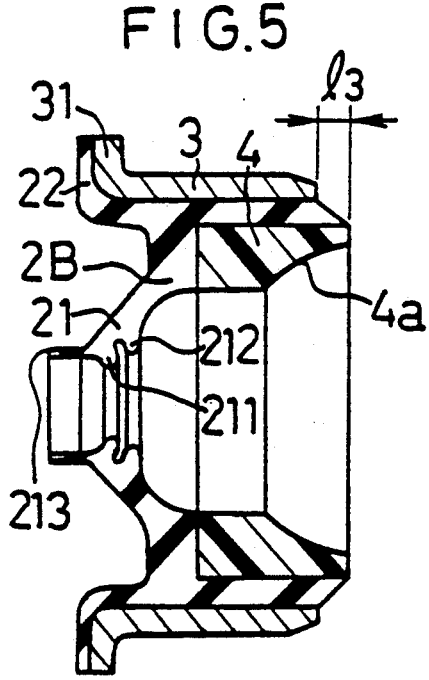
FIG. 5 is a longitudinal sectional view of a vibration damping rubber member in accordance with the third embodiment of the invention.

The details of the vibration damping rubber members of the third embodiment will be explained with reference to FIG. 5. Vibration damping rubber member 2B has a cylindrical shape. The outer cylinder 3 which has an L-shaped cross-section, is joined to the outer surface of the vibration damping rubber member 2B, and is provided with a flange portion 31 in its outside end. A resin insert 4 which is made of a resin material having good slidability is embedded in the vibration damping rubber member 2B. The inside end portion of the insert 4 protrudes from the inside end of the outer cylinder 3 by a predetermined amount $l_3$. The inside half portion of the insert 4 has a concave surface 4a having a configuration conforming to that of the spherical outer surface of the expanded portion 11.

A thin-walled cylindrical seal portion 21 extends radially inwardly from the outside portion of the vibration damping rubber member 2B, and inwardly projecting seal lips 211 and 212 are formed in the seal portion 21 in parallel with each other. Another seal lip 213 is also formed in the seal portion 21 so as to project sidewardly.

The vibration damping rubber member 2B is further provided with a shock absorbing rubber layer 22 extending along the flange portion 31 of the outer cylinder 3.

The vibration damping rubber members 2A, 2B having the above-described construction are press-fitted between the eye 5 and the inner cylinder 1 coated with lubricant from both ends of the eye 5 until the concave surface 4a of each insert 4 protrudes from the inside end of the outer cylinder 3 comes into contact with the outer surface of the expanded portion 11. Then, the vibration damping rubber members 2A, 2B are further press-fitted until the flange portions 31 of the outer cylinder 3 abut on the opening end of the eye 5. This results in the vibration damping rubber members 2A, 2B being compressed and deformed in an axial direction, and each insert 4 relatively moving backwards until the inside end surface of each insert 4 becomes substantially flush with the inside end surface of each of the vibration damping rubber members 2A, 2B as shown in FIG. 4. An elastic force of each of the vibration damping rubber members 2A, 2B is applied to each insert 4 with the result that the insert 4 is brought into close contact with the outer surface of the expanded portion 11. Accordingly, the concave surface 4a of each insert 4 comes into contact with the outer surface of the expanded portion 11 via the lubricant without generating play therebetween so as to smoothly slide thereon. As a result, the suspension arm can smoothly rotate about the inner cylinder 1, and also twistingly rock freely in the directions shown by the arrows in FIG. 4.

At this time, the seal portions 21 are forcibly deformed outwardly by the inner cylinder 1 so that the seal lips 211, 212 come into pressure contact with the outer surface of the inner cylinder 1 to prevent the lubricant from leaking out from the interior of the vibration damping bushing. Moreover, when the brackets 62 are attached to the inner cylinder 1, the end of each seal lip 213 comes into elastic contact with the inside surface of each bracket 62 to prevent dirt or the like from entering the interior of the vibration damping bushing.

The shock absorbing rubber layers 22 serve to prevent the generation of noise or the like when the flange portions 31 of the outer cylinder 3 abut on the inside surfaces of the brackets 62.

Figure 6:
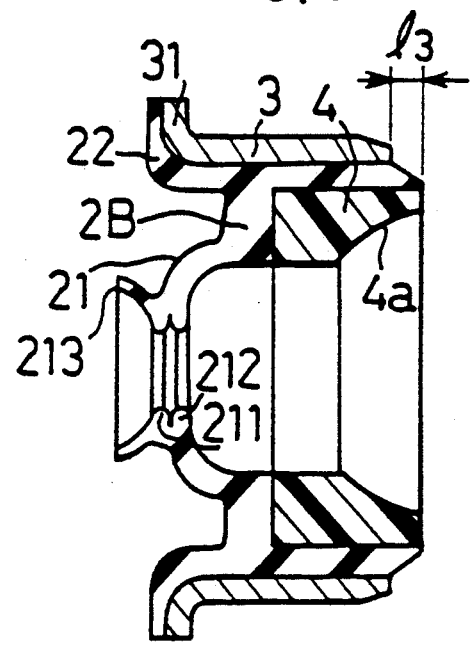
FIG. 6 is a longitudinal sectional view of a vibration damping rubber member used in a fourth embodiment of a vibration damping bushing according to the present invention.

FIG. 6 illustrates a fourth embodiment of the present invention.

In FIG. 6, the seal portion 21 in the free state is of the same shape as it is when deformed due to the penetration of the inner cylinder 1, and the internal diameter thereof is less than the external diameter of the inner cylinder 1. The construction of the fourth embodiment of the remainder of the vibration damping bushing is substantially the same as that of the third embodiment. In accordance with the fourth embodiment, substantially the same operation effect as that of the third embodiment can be obtained.

Figure 7:
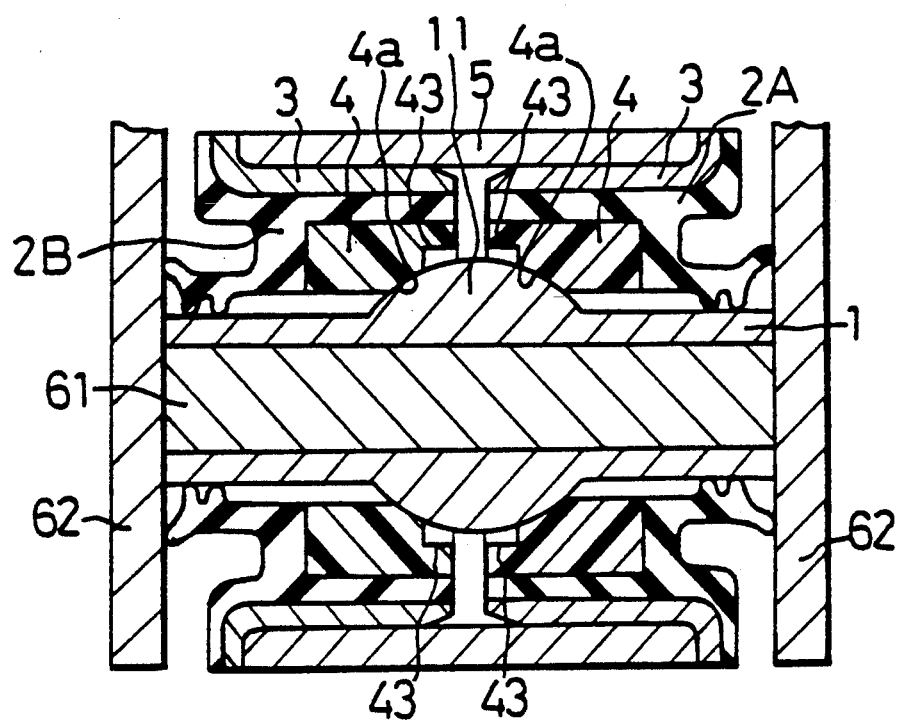
FIG. 7 is an overall longitudinal sectional view of a fifth embodiment of a vibration damping bushing according to the present invention.

FIG. 7 illustrates a fifth embodiment of the present invention. In FIG. 7, each insert 4 is provided with an annular groove 43 having a rectangular cross section in an inside end portion thereof so as to face the expanded portion 11. Groove 43 which serves as a grease groove for retaining lubricant around the inner cylinder 1. The construction of the remainder of the vibration damping bushing of the fifth embodiment is substantially the same as that of the third embodiment. In accordance with the fifth embodiment, the grease groove enables the smoother rotation of the suspension arm about the inner cylinder 1.

Figure 8:
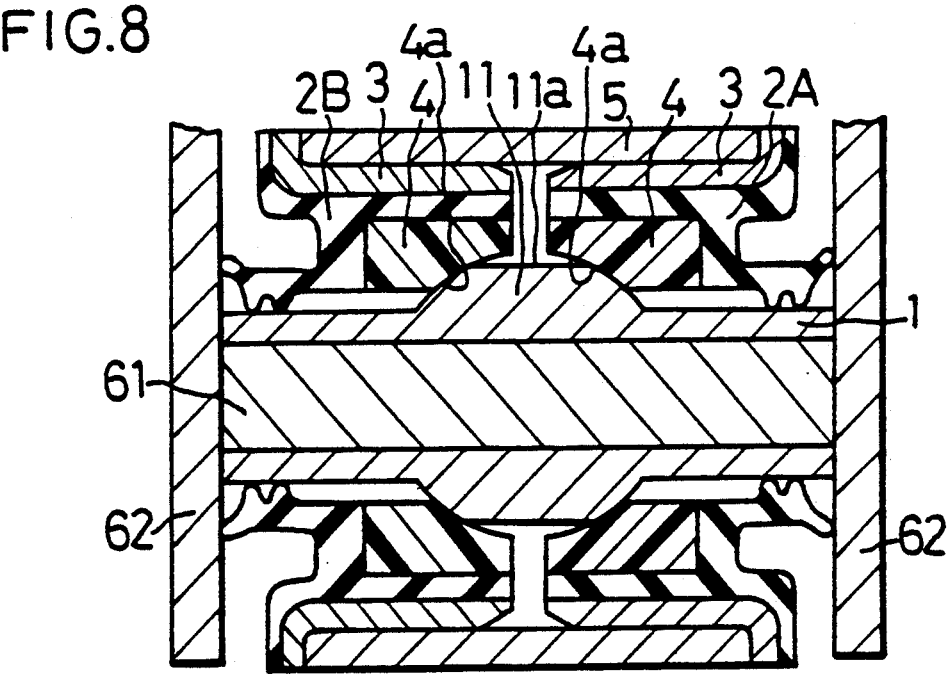
FIG. 8 is an overall longitudinal sectional view of a sixth embodiment of a vibration damping bushing according to the present invention.

FIG. 8 illustrates a sixth embodiment of the present invention. In FIG. 8, the spherical expanded portion 11 is provided with a flat top surface 11a. A space serving as the grease groove is formed between the flat top surface 11a and the concave surfaces 4a of the inserts 4. This construction also achieves an operational effect similar to that of the fifth embodiment.

Figure 9:
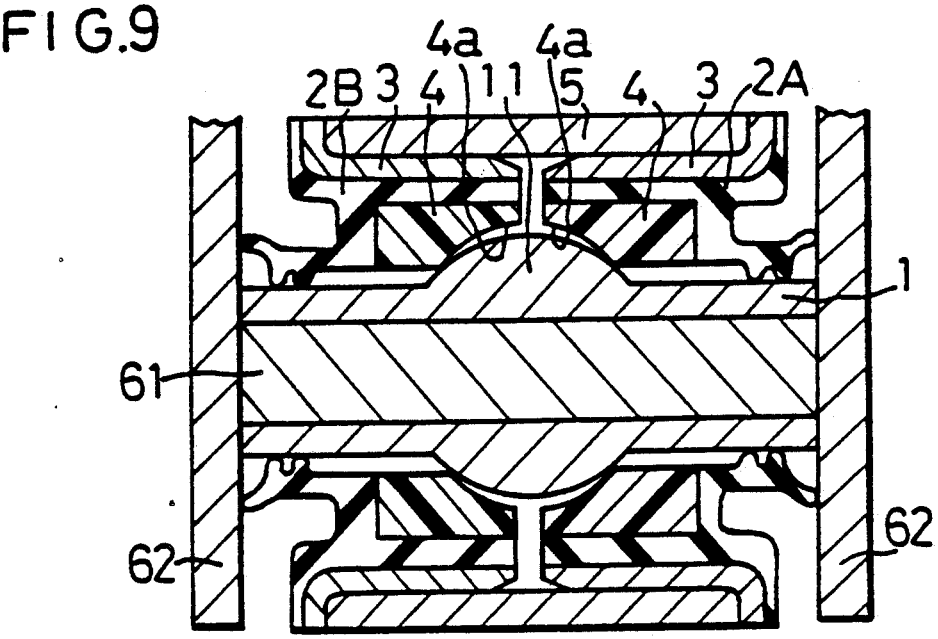
FIG. 9 is an overall longitudinal sectional view of a seventh embodiment of a vibration damping bushing according to the present invention.

FIG. 9 illustrates a seventh embodiment of the present invention. In FIG. 9, the concave surface 4a of each insert 4 has a configuration which does not conform to that of the top surface 11a of the expanded portion 11 so as to generate a space between the top surface 11a and the opposed concave surfaces 4a. This space serves as the grease groove. The seventh embodiment also achieves an operational effect similar to that of the fifth embodiment.

What is claimed is:

1. A cylindrical vibration damping bushing comprising:
    an outer cylinder having first and second longitudinal ends;
    an inner cylinder coaxially disposed within said outer cylinder, and having an expanded portion at an axially central portion thereof; said expanded portion expanding radially outwardly to define a spherical outer surface;
    a pair of cylindrical vibration damping rubber members press fitted between said outer cylinder and said inner cylinder from each longitudinal end of said outer cylinder so as to be joined with said outer cylinder, each said vibration damping rubber member having an inside half portion and an outside half portion; and
    a pair of ring-shaped inserts, each formed from a resin material having good slidability, embedded in said inside half portion of each of said cylindrical vibration damping rubber members, whereby an outer surface of each of said pair of ring-shaped inserts is in close contact with said inside half portion of each of said cylindrical vibration damping rubber members;
    each of said ring-shaped inserts having a concave surface for sliding on said spherical outer surface of said expanded portion; each of said cylindrical vibration damping rubber members being integrally provided with a projecting portion which projects radially outwardly from said outside half portion, an inside axial surface of each said projecting portion abutting a respective longitudinal end of said outer cylinder, and a seal portion extending from said outside half portion towards an outer surface of a respective end of said inner cylinder; a projecting end of each said seal portion being in airtight contact with said respective outer surface of said inner cylinder end.

2. A cylindrical vibration damping bushing according to claim 1, wherein:
    inside end surfaces of said pair of inserts abut one another adjacent an axially central portion of said inner cylinder.

3. A cylindrical vibration damping bushing according to claim 1, wherein:
    said outer cylinder is composed of a pair of outer cylinders of which inner end surfaces are opposed to each other at a predetermined distance, and an inside end surface of each of said pair of ring-shaped inserts protrudes in an axial direction from an inside end surface of each of said pair of outer cylinders by a predetermined amount at least prior to said inserts being in operable contact with said expanded portion.

4. A cylindrical vibration damping bushing according to claim 1, further comprising:
    a grease groove defined between each said insert and said expanded portion of said inner cylinder for retaining lubricant therein.

5. A cylindrical vibration damping bushing according to claim 4, wherein:
    an annular groove having a rectangular cross section is formed in said concave surface of each of said pair of inserts to define said grease groove with said spherical outer surface of said expanded portion.

6. A cylindrical vibration damping bushing according to claim 4, wherein:

said expanded portion has a flat top surface to define said grease groove with said concave surfaces of said inserts.

7. A cylindrical vibration damping bushing according to claim 4, wherein:
said concave surface of each of said inserts has such a configuration different from that of an opposed top surface of said expanded portion of said inner cylinder so that said grease groove is defined by said concave surface of each of said inserts and said top surface of said expanded portion.

8. A cylindrical vibration damping bushing according to claim 1, wherein:
said seal portion is provided with at least one cylindrical seal lip which is brought into pressure contact with said respective outer surface of said inner cylinder end.

9. A cylindrical vibration damping bushing according to claim 1, wherein:
said seal portion is provided with a cylindrical seal lip which is brought into elastic contact with a bracket provided for securing said inner cylinder.

10. A cylindrical vibration damping bushing according to claim 1, wherein:
each said insert is formed from one of high molecular weight polyethylene and polyacetal.

11. A cylindrical vibration damping bushing according to claim 1 wherein:
an inside end surface of each of said pair of ring-shaped inserts is substantially flush with an inside end surface of each of said cylindrical vibration damping rubber members.

* * * * *